United States Patent

Marijuan De Santiago et al.

[11] Patent Number: 5,514,201
[45] Date of Patent: May 7, 1996

[54] MICROELEMENT DEFICIENCY CORRECTOR FOR FARMLAND AND PROCESS FOR PREPARATION THEREOF

[75] Inventors: Luis Marijuan De Santiago, Madrid; Generoso Martin Blesa, La Escaleruela, both of Spain

[73] Assignees: Tioxide Europe, S.A., Madrid; Industrias Quimicas Gombau Y Martin, S.L., La Escaleruela, both of Spain

[21] Appl. No.: 391,728

[22] Filed: Feb. 21, 1995

Related U.S. Application Data

[63] Continuation of Ser. No. 898,788, Jun. 12, 1992, abandoned.

[30] Foreign Application Priority Data

Jun. 13, 1991 [ES] Spain ...................... 9101428

[51] Int. Cl.$^6$ ................ C05F 3/00; C05D 9/02; C05D 11/00
[52] U.S. Cl. ............ 71/21; 71/24; 71/63; 71/64.03; 71/903; 23/304
[58] Field of Search ............... 71/1, 11, 12, 15, 71/21, 23, 63, 903, 904, 24; 23/295 R, 301, 304

[56] References Cited

U.S. PATENT DOCUMENTS

| | | | |
|---|---|---|---|
| 3,135,595 | 6/1964 | Williams ................... | 23/301 |
| 3,936,292 | 2/1976 | Piccolo et al. ................ | 71/63 |
| 4,328,025 | 5/1982 | Whitcomb .................. | 71/23 |
| 4,455,161 | 6/1984 | Cohen et al. ................. | 71/63 |
| 4,477,323 | 10/1984 | Esna-Ashari et al. ............ | 23/295 R |
| 4,589,906 | 5/1986 | Brunn et al. ................. | 71/63 |

*Primary Examiner*—Ferris Lander
*Attorney, Agent, or Firm*—Darby & Darby

[57] ABSTRACT

A process for forming a microelement deficiency-corrector comprising a mixture of trace elements, in hydrated sulfate form, optionally containing carbonates and including iron, magnesium, manganese and zinc, with the following typical elemental analysis: Magnesium 3.5–6%; iron 12–19%; Manganese 11.5%; zinc 0.2–0.3% and organic matter 0–45%.

The process comprises mixing 50–95% of the by-product of manufacture of titanium bioxide via sulfate, 5–10% alkaline earth carbonate or magnesite and, optionally, 10–45% organic matter, grinding the mixture, granulating it and drying it, cooling it and screening it.

The corrector is used in agriculture to prevent and control ferric chlorysis, to favour physiological processes of harvests in which iron takes part and to avoid deficiencies of manganese and zinc farmland.

3 Claims, No Drawings

MICROELEMENT DEFICIENCY CORRECTOR FOR FARMLAND AND PROCESS FOR PREPARATION THEREOF

This application is a continuation of U.S. patent application Ser. No. 07/898,788, filed Jun. 12, 1992 and now abandoned.

FIELD OF THE INVENTION

The present invention relates to the utilization of by-products of manufacture of titanium bioxide via sulfate, and, specifically it refers to a microelement deficiency corrector for farmland and process for preparation thereof.

BACKGROUND OF THE INVENTION

As is known, the manufacturing process of titanium bioxide via sulfate involves a first step of attack of ilmenite with sulfuric acid, followed by a hydrolysis step that leads to said titanium bioxide which is a pigment with important industrial uses. The effluent coming from the hydrolysis step is subjected to a process of crystallization from which the so-called "copperas" or heptahydrated iron sulfate results with agricultural uses and that is used to manufacture mixed feeds and that, in ferric sulfate form is used to treat water.

The crystallization water is concentrated and afterwards filtered, recycling the filtrate in the first attack step with sulfuric acid.

The residue of filtration is a metal sulfate mixture that cannot be stored as waste material due to leaching problems, whose only use developed up to now has been the production of sulfuric acid by means of roasting, which involves costly investments.

Afterwards some patents which describe the use of this by-product in the manufacture of sulfuric acid are indicated:

Bayer's European patent "A" which refers to the use of a Fundabac filter for the separation of salts.

Bayer's European patent "B" which refers to a process to elaborate sulfuric acids which contain metal sulfate, called "fine acids," by means of concentration by evaporation.

Bayer's European patent 139120 "B" which refers to the production of sulfur dioxide by thermal decomposition of metal sulfates and simultaneous roasting of sulfide ores.

Bayer's European patent 145984 "A", which refers to a sulfate process in which the residual acid and the metal sulfates are recycled, at least in part, at the digestion step.

Bayer's European patent 0194544 "A" which refers to a process for recirculation of sulfuric acid used containing metal sulfates, by means of evaporation until a concentration of 40–85% of $H_2SO_4$.

The basic advantage that the present invention provides over the present prior art is that it makes it possible to transform the cited by-product into a marketable product by means of a simple process in a low cost installation.

DETAILED DESCRIPTION OF THE INVENTION

The present invention refers to a microelement deficiency corrector for farmland and to a process for preparation thereof.

A by-product which is a mixture of metal sulfates having the following typical, primarily elemental analysis is obtained in the manufacturing process of titanium bioxide. Throughout this specification, it will be understood that "typical elemental analysis" refers to the weight percentage of each item, primarily elemental, (without regard to the total weight of the compound of which it forms a part) relative to the total weight of the mixture.

| | | |
|---|---|---|
| (*)S | 19 | % |
| Fe | 21.3 | % |
| $SiO_2$ | 0.06 | % |
| $Al_2O_3$ | 0.45 | % |
| CaO | 0.01 | % |
| Zn | 0.34 | % |
| Pb | 0.03 | % |
| As | 0.01 | % |
| MgO | 0.25 | % |
| Mn | 1.65 | % |
| Cu | 0.01 | % |
| Sn | 12 | ppm |
| Bi | 1 | ppm |
| Co | 40 | ppm |
| Cd | 1 | ppm |
| Hg | 0.01 | ppm |
| Ni | 30 | ppm |
| $H_2O$ | 8.2 | % |
| $H_2SO_4$ | 15.1 | % |
| $TiO_2$ | 1.5 | % |

(*)corresponding to sulfuric acid and sulfates

This by-product is used as raw material in the process of the present invention in a proportion of 50% or greater (i.e., up to 95%), along with 5–10% of alkaline earth carbonates or magnesites and, optionally, 10–45% of organic matter: manure or lignites.

The deficiency corrector obtained is a mixture of trace elements, in hydrated sulfate form, that can contain carbonates. The metals that essentially form part of the composition thereof are iron, magnesium, manganese and zinc.

The typical elemental analysis of this deficiency corrector is the following:

| | |
|---|---|
| Magnesium (as Mg) | 3.5–6% |
| Iron (as Fe(II)) | 12–19% |
| Manganese | 1–1.5% |
| Zinc | 0.2–0.3% |
| Organic Matter | 0–45% |

The process of the invention is characterized because it comprises the following steps:

a) introducing in a mixture at least 50% and up to 95% of by-product from manufacturing titanium bioxide via sulfate, 5–10% of alkaline earth carbonate or magnesite and, optionally, 10–45% of organic matter selected from manure and lignites and mixing for 5–10 minutes;

b) passing the mixture coming from step (a) through a grinder, where the size thereof is reduced to particles between 0 and 2 mm;

c) dosing the product coming from step (b) in a granulating machine where it is transformed into powder in spheres of different sizes;

d) passing the powder of the granulating machine to a rotary dryer with an air intake temperature between 100° and 500° C.;

e) passing the granulate coming from the dryer to a cooler from which it comes out at a temperature between 40° C. and room temperature;

f) passing the product, once cool, through a screen which selects the granulate by sizes between 1 and 5 mm of diameter and, subsequently, packaging it.

Hereinafter the typical elemental analysis of two of the correctors obtained by the process which has just been described are provided:

| 1) Typical analysis: | |
|---|---|
| Magnesium (as MgO) | 5.8% |
| Iron (as Fe(II)) | 19.0% |
| Manganese | 1.5% |
| Zinc | 0.3% |
| 2) Typical analysis: | |
| Magnesium (as Mg O) | 3.5.4% |
| Iron as Fe (II)) | 12–13% |
| Manganese | 1–1.5% |
| Zinc | 0.2% |
| Organic matter (manure) | 10% |

The correctors of the present invention are used in agriculture to prevent and control the problem of ferric chlorysis; the magnesium contents favor the physiological processes in which the iron intervenes. The manganese and zinc contents suffice to avoid deficiencies thereof.

These correctors can be used within a wide range of dosification, in the neighborhood of 10–2000 g/plant. The following can be mentioned as representative.

Young trees and vines: 100–600 g/plant

Trees of complete production: 600–2000 g/plant

Greenhouse and stock plants: 10–60 g/plant

EMBODIMENTS OF THE INVENTION

The present invention is additionally illustrated by means of the following examples, which are not restrictive of the scope thereof, which is exclusively defined by the attached set of claims.

EXAMPLE 1

50% of the by-product from the manufacture of titanium bioxide via sulfate, 5% magnesium oxide and 45% sheep manure are introduced in a mixer and mixed for 8 minutes. The mixture is removed and passed to the grinder. The fine product is continuously poured into a granulating machine from which the formed granulates pour over. These granules are passed to the dryer in which a stream of air at 400° C. is introduced.

From the opposite end, the dry granulated product flows at 50° C. From here the product passes to the cooler feed by a stream of air at 10° C., in back stream. At the end of the cooler the product reaches a temperature of 25° C.

The granulate is raised to a double screen with mesh of 5 and 1 mm openings, respectively, collecting the fraction that remains between both screens. The granulate selected is packaged, by weighing in 50 kg raffia bags.

EXAMPLE 2

Two of the typical elemental analyses corresponding to two correctors obtained by the process of the invention are given hereinafter:

| Corrector 1 Typical analysis: | |
|---|---|
| Magnesium (as MgO) | 5.8% |
| Iron (as Fe(II)) | 19.0% |
| Manganese | 1.5% |
| Zinc | 0.3% |
| Corrector 2 Typical analysis: | |
| Magnesium (as MgO) | 3.5–4% |
| Iron (as FE(II)) | 12.13% |
| Manganese | 1–1.5% |
| Zinc | 0.2% |
| Organic matter (manure) | 10% |

We claim:

1. A process for the preparation of a microelement deficiency corrector for farmland comprising a mixture of trace elements, in hydrated sulfate form, and containing alkaline earth carbonates or magnesite, whose essential metals are iron, magnesium, manganese and zinc and whose typical elemental analysis is the following: magnesium(as MgO), 3.5–4%; iron (as Fe II), 12–13%; manganese, 1–1.5%; zinc, 0.2%; and organic matter, 10%; said process comprising the following steps:

(a) introducing in a mixer 50–95% of by-product from manufacturing titanium bioxide via sulfate, 5–10% alkaline earth carbonate or magnesite and, 10% of organic matter selected from manure and lignites and mixing for 5–10 minutes;

(b) passing the mixture coming from step (a) through a grinder, where the size thereof is reduced to particles between 0 and 2 mm;

(c) dosing the product coming from step (b) in a granulating machine where it is transformed into powder in spheres of different sizes;

(d) passing the powder of the granulating machine to a rotary dryer with an air intake temperature between 100° and 500° C.;

(e) passing the granulate coming from the dryer to a cooler from which it comes out at a temperature between 40° C. and room temperature;

(f) passing the product, once cool, through a screen which selects the granulate by sizes between 1 and 5 mm of diameter and, subsequently, packaging it;

wherein the by-product from the manufacture of titanium bioxide via sulfate contains a mixture of metal sulfates which have the following typical elemental analysis based upon the total weight of said by-product:

| *S | 19% |
|---|---|
| Fe | 21.3% |
| $SiO_2$ | 0.06% |
| $Al_2O_3$ | 0.45% |
| CaO | 0.01% |
| Zn | 0.34% |
| Pb | 0.03% |
| As | 0.01% |
| MgO | 0.25% |
| Mn | 1.65% |
| Cu | 0.01% |
| Sn | 12 ppm |
| Bi | 1 ppm |
| Co | 40 ppm |

| | |
|---|---|
| Cd | 1 ppm |
| Hg | 0.01 ppm |
| Ni | 30 ppm |
| $H_2O$ | 8.25% |
| $H_2SO_4$ | 15.1% |
| $TiO_2$ | 1.5% |

*corresponds to sulfuric acid and sulfates.

2. A process for the preparation of a microelement deficiency corrector for farmland comprising a mixture of trace elements, in hydrated sulfate form, and containing alkaline earth carbonates or magnesite, whose essential metals are iron, magnesium, manganese and zinc and whose typical elemental analysis is the following: magnesium (as MgO), 5.8%; iron (as Fe II), 19%; manganese, 1.5%; zinc, 0.3%; and organic matter, 10–45%; said process comprising the following steps:

(a) introducing in a mixer 50–95% of by-product from manufacturing titanium bioxide via sulfate, 5–10% alkaline earth carbonate or magnesite and, 10–45% of organic matter selected from manure and lignites and mixing for 5–10 minutes;

(b) passing the mixture coming from step (a) through a grinder, where the size thereof is reduced to particles between 0 and 2mm;

(c) dosing the product coming from step (b) in a granulating machine where it is transformed into powder in spheres of different sizes;

(d) passing the powder of the granulating machine to a rotary dryer with an air intake temperature between 100° and 500° C.;

(e) passing the granulate coming from the dryer to a cooler from which it comes out at a temperature between 40° ! C. and room temperature;

(f) passing the product, once cool, through a screen which selects the granulate by sizes between 1 and 5 mm of diameter and, subsequently, packaging it;

wherein the by product from the manufacture of titanium bioxide via sulfate contains a mixture of metal sulfates which have the following typical elemental analysis based upon the total weight of said by-product:

| | |
|---|---|
| *S | 19% |
| Fe | 21.3% |
| $SiO_2$ | 0.06% |
| $Al_2O_3$ | 0.45% |
| CaO | 0.01% |
| Zn | 0.34% |
| Pb | 0.03% |
| As | 0.01% |
| MgO | 0.25% |
| Mn | 1.65% |
| Cu | 0.01% |
| Sn | 12 ppm |
| Bi | 1 ppm |
| Co | 40 ppm |
| Cd | 1 ppm |
| Hg | 0.01 ppm |
| Ni | 30 ppm |
| $H_2O$ | 8.25% |
| $H_2SO_4$ | 15.1% |
| $TiO_2$ | 1.5% |

*corresponds to sulfuric acid and sulfates.

3. A process for the preparation of a microelement deficiency corrector for farmland comprising a mixture of trace elements, in hydrated sulfate form, and containing alkaline earth carbonates or magnesite, whose essential metals are iron, magnesium, manganese and zinc and whose typical elemental analysis is the following: magnesium (as MgO), 3.5–6%; iron (as Fe II), 12–19%; manganese, 1–1.5%; zinc, 0.2–0.3%; and organic matter, 10–45%; said process comprising the following steps:

(a) introducing in a mixer 50–95% of by-product from manufacturing titanium bioxide via sulfate, 5–10% alkaline earth carbonate or magnesite and, 10–45% of organic matter selected from manure and lignites and mixing for 5–10 minutes;

(b) passing the mixture coming from step (a) through a grinder, where the size thereof is reduced to particles between 0 and 2 mm;

(c) dosing the product coming from step (b) in a granulating machine where it is transformed into powder in spheres of different sizes;

(d) passing the powder of the granulating machine to a rotary dryer with an air intake temperature between 100° and 500° C.;

(e) passing the granulate coming from the dryer to a cooler from which it comes out at a temperature between 40° C. and room temperature;

(f) passing the product, once cool, through a screen which selects the granulate by sizes between 1 and 5 mm of diameter and, subsequently, packaging it;

wherein the by-product from the manufacture of titanium bioxide via sulfate contains a mixture of metal sulfates which have the following typical elemental analysis based upon the total weight of said by-product:

| | |
|---|---|
| *S | 19% |
| Fe | 21.3% |
| $SiO_2$ | 0.06% |
| $Al_2O_3$ | 0.45% |
| CaO | 0.01% |
| Zn | 0.34% |
| Pb | 0.03% |
| As | 0.01% |
| MgO | 0.25% |
| Mn | 1.65% |
| Cu | 0.01% |
| Sn | 12 ppm |
| Bi | 1 ppm |
| Co | 40 ppm |
| Cd | 1 ppm |
| Hg | 0.01 ppm |
| Ni | 30 ppm |
| $H_2O$ | 8.25% |
| $H_2SO_4$ | 15.1% |
| $TiO_2$ | 1.5% |

*corresponds to sulfuric acid and sulfates.

* * * * *